United States Patent [19]

Yoshida et al.

[11] Patent Number: 5,049,717
[45] Date of Patent: Sep. 17, 1991

[54] ARC STUD WELDING MACHINE

[75] Inventors: Mikihiko Yoshida, Ibaragi; Hiroaki Yamada, Saitama, both of Japan

[73] Assignee: Okabe Co., Ltd., Tokyo, Japan

[21] Appl. No.: 611,678

[22] Filed: Nov. 13, 1990

[30] Foreign Application Priority Data

Nov. 13, 1989 [JP] Japan ................................. 1-294339
Nov. 13, 1989 [JP] Japan ................................. 1-294340

[51] Int. Cl.⁵ .............................................. B23K 9/20
[52] U.S. Cl. .................................................... 219/98
[58] Field of Search .................................... 219/98, 99

[56] References Cited

U.S. PATENT DOCUMENTS 3,557,339  1/1971  Rondeau ............................. 219/99

FOREIGN PATENT DOCUMENTS 59-141379  8/1984  Japan .
60-181269 12/1985  Japan .

Primary Examiner—Clifford C. Shaw
Attorney, Agent, or Firm—Sixbey, Friedman, Leedom & Ferguson

[57] ABSTRACT

An arc stud welding machine having an arc shield mount section for retaining a generally semicylindrical arc shield segment. The arc shield mount section has a semicylindrical inner clamp member for abutment against an inner surface of said arc shield segment, two quarter cylinder outer clamp members for abutment against an outer surface of said arc shield segment, and pressure screws for applying pressure in the direction of said arc shield segment to said outer clamp members at approximately the middle of the periphery thereof.

7 Claims, 6 Drawing Sheets

F I G .12
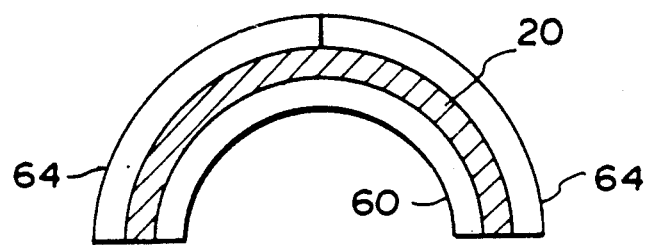
F I G .13
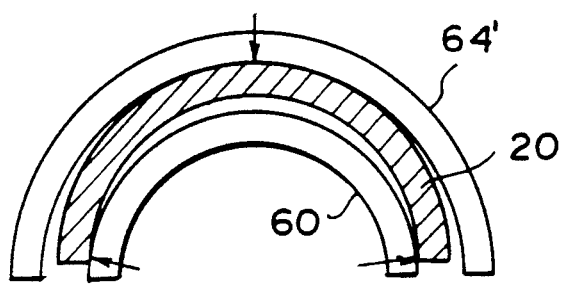
F I G .14
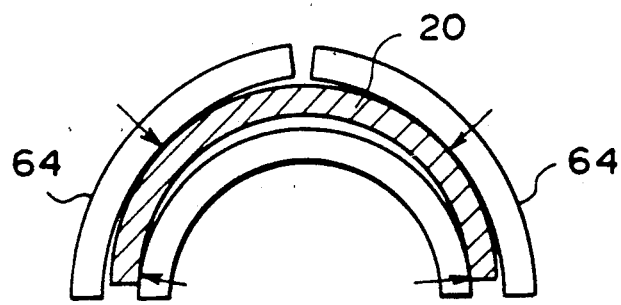

ARC STUD WELDING MACHINE

BACKGROUND OF THE INVENTION

1. Field of the Invention

This invention relates to an arc stud welding machine having an arc shield mount section for retaining a generally semicylindrical arc shield segment, and more particularly to an arc stud welding machine comprising two levers each having an arc shield segment mounted at the tip thereof, said levers being openable and closable for contacting and separating the two arc shield segments.

2. Description of the Prior Art

In arc stud welding, a welding accessory called an arc shield (ferrule) has conventionally been used for molding the shape of the molten metal, shielding the weld portion from external air, and other such purposes.

Such arc shields have in the past been made of, for example, ceramic. The conventional ceramic arc shield breaks under the thermal shock (1,300° C. and higher) during welding and cannot be reused. Therefore after welding it is removed from the weld portion by smashing it with a hammer or the like.

Thus the conventional ceramic arc shield entails the problems that it is an expendable item which must be employed one for each stud and cannot be reused and, moreover, that it must be fitted one per stud and then, after welding, be smashed for removal.

In order to overcome these problems, it has been proposed for example in Japanese Unexamined Patent Publication No. 59(1984)-141379 and Japanese Unexamined Utility Model Publication No. 60(1985)-181269 that the arc shield be made reusable a number of times by constituting it from a material with superior thermal shock resistance property and forming it of separable segments.

That is, it has been proposed that the arc shield be made reusable a number of times by constituting it from a material with superior thermal shock resistance property and forming it of separable segments, making the segmented arc shield (i.e. the arc shield segments) capable of contacting with and separating from each other, carrying out stud welding when the arc shield segments contact to form a cylindrical arc shield, and removing the arc shield from the welded stud by separating the arc shield segments after completion of welding, thereby enabling repeated use of the arc shield numerous times.

In the case of fabricating the arc shield of a material superior in thermal shock resistance and in a segmented form so as to make the arc shield repeatedly usable a large number of times, it is conceivable to use an arrangement wherein, for example, the arc shield is fabricated of a ceramic having superior thermal shock resistance property, the welding machine is provided with a pair of arc shield mount sections, each of the arc shield mount sections is caused to retain one generally semicylindrical arc shield segment of the two segments into which the arc shield is divided, the two mount sections are brought toward each other to form a cylindrical arc shield from the two arc shield segments, arc stud welding is thereafter conducted and, after the completion of the welding, the two mount sections are separated, whereby the arc shield is removed from the welded stud.

It is further conceivable to realize the clamping of the arc shield segment by the arc shield mount section by, for example, gripping the generally semicylindrical arc shield segment between a similarly shaped approximately semicylindrical inner clamp member and an outer clamp member.

However, the arc shield segment is, as mentioned above, made of ceramic and has an extremely low coefficient of thermal expansion while the arc shield mount section, including the inner and outer clamp members, would generally be made of metal and have a high coefficient of thermal expansion, so that in applying the aforesaid arrangement if the arc shield segment is simply clamped by the arc shield mount section having a different coefficient of thermal expansion, the high temperature at the time of welding would cause thermal stress due to the difference in coefficients of thermal expansion to act on the arc shield, thus making the arc shield vulnerable to breakage.

Further, in the above-described welding machine, the arc shield segments are contacted with each other by pressing the welding machine onto the base metal against the force of a compression spring and are separated from each other by the force of restoration of the compression spring when the force pressing the welding machine onto the base metal is relieved. With this method of contacting and separating the arc shield segments it is difficult to appropriately control the arc shield segment contacting and separating operation. For example, although the separation of the arc shield segments should be conducted by gradually relieving the pressure, it is extremely difficult by a manual operation to relieve the pressure once applied in an appropriate gradual manner and it frequently happens that the pressure is relieved rapidly. This leads to a sudden separation of the arc shield segments, making it difficult to always carrying out the welding operation appropriately and stably.

Further, in the above-described welding machine, no consideration whatsoever is given to such matters as making the welding machine easier for the operator to hold when conducting the welding operation or making the welding operation easier to conduct. The disclosed welding machine is thus poor in welding operability.

SUMMARY OF THE INVENTION

The primary object of the present invention is, in light of the aforesaid circumstances, to provide a welding machine which sufficiently reduces the thermal stress acting on the arc shield segment due to the difference in the coefficients of thermal expansion and thus enables the arc shield to be retained in good condition.

Another object of the present invention is, in light of the aforesaid circumstances, to provide an arc stud welding machine which enables the contact and separation of arc shield segments to be conducted easily and appropriately and which exhibits superior welding operability.

For achieving the aforesaid object, the present invention provides an arc stud welding machine having an arc shield mount section for retaining a generally semicylindrical arc shield segment, characterized in that said arc shield mount section comprises a semicylindrical inner clamp member for abutment against an inner surface of said arc shield segment, two quarter cylinder outer clamp members for abutment against an outer surface of said arc shield segment, and pressure means for applying to said outer clamp members at approximately the middle of the periphery thereof pressure in the direction of said arc shield segment.

Since the arc stud welding machine according to the present invention is arranged such that the generally semioylindrical arc shield segment is clamped between a semicylindrical inner clamp member and two quarter cylinder outer clamp members and pressure in the direction of said arc shield segment is applied to said outer clamp members at approximately the middle of the periphery thereof by a pressure means. clamping of the arc shield member is effectively accomplished As a result, thermal stress due to differences in coefficient of thermal expansion can be adequately reduced and the arc shield segment can be retained in good condition.

Further, the present invention provides an arc stud welding machine comprising two levers each having an arc shield segment mounted at the tip thereof, said levers being openable and closable for contacting and separating the two arc shield segments, the arc stud welding machine being characterized in that one of said two levers is provided with a handle, said handle extending perpendicular to the longitudinal direction of a stand on which the welding machine is mounted.

Since the arc stud welding machine according to this invention is constituted such that the opening/closing of two levers for contacting and separating the arc shield segments is conducted through the operation of a handle. As a result, the contact and separation of the arc shield segments can be more easily and appropriately controlled than in the case where it is carried out by applying and releasing pressure, so that appropriate and stable welding operation can be carried out at all times.

Moreover, the aforesaid handle extends approximately perpendicular to the longitudinal direction of the stand, which enables the handle to double as a means for stabilizing welding posture. Thus by gripping this handle the operator is able to maintain the welding machine in good balance at all times, and this contributes to improvement of the welding operability.

DESCRIPTION OF THE PREFERRED EMBODIMENTS

Embodiments of the invention will hereinafter be explained with reference to the drawings.

Figure 1:
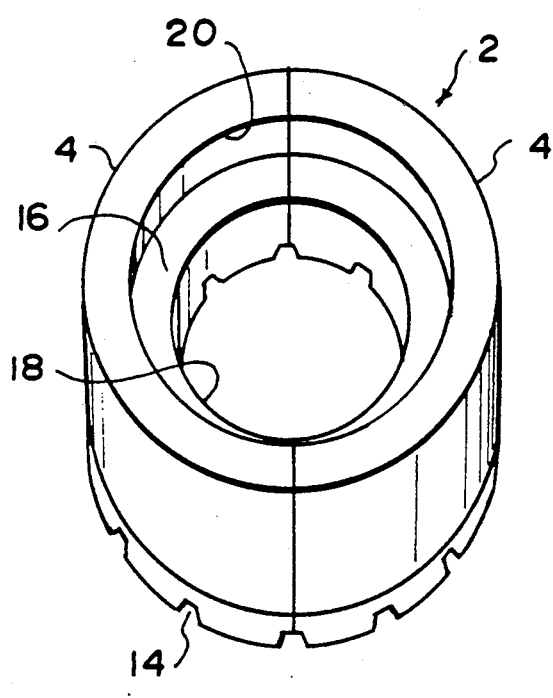
FIGS. 1 to 3 are perspective views showing an arc shield used in an embodiment of the arc stud welding machine according to the present invention.
Figure 2:
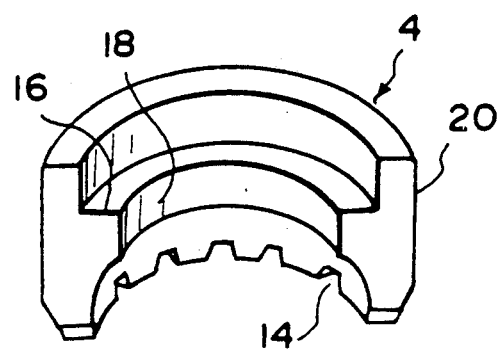
Figure 3:
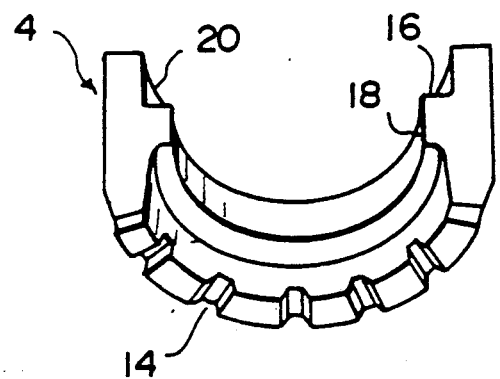

FIG. 1 is a perspective view of an arc shield used in an embodiment of the arc stud welding machine according to the present invention. The illustrated arc shield 2 is constituted as an assembly of two arc shield segments 4 made of a ceramic having superior thermal shock resistance characteristics, and is generally cylindrical in form. The two arc shield segments 4 are identical semicylinders. FIG. 2 is a perspective view showing one of the arc shield segments 4 as viewed obliquely from above while FIG. 3 is a perspective view showing the same as viewed obliquely from below.

Figure 4:
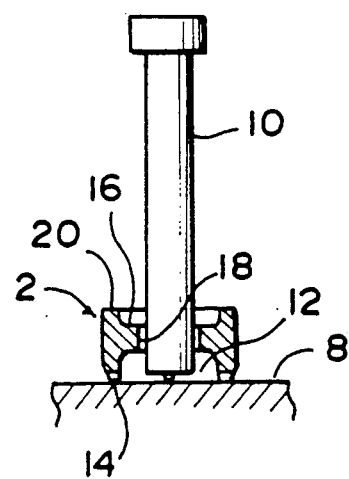
FIG. 4 is a sectional view showing the arc shield of FIG. 1 in use.

As shown in FIG. 4, when a stud 10 is to be welded to a base metal 8 (the welded material), the arc shield 2 is fitted around the stud 10 with its lower surface in abutment with the upper surface of the base metal 8 so as to enclose the weld portion (the portion of abutment between the lower surface of the stud 10 and the upper surface of the base metal 8). When welding is conducted with the arc shield 2 disposed in this state, the arc shield 2 performs such functions as shielding the weld portion 12 from external air during the welding operation and molding the molten metal formed at the weld portion 12.

The bottom surface of the arc shield 2 is formed with a plurality of communicating notches 14 of prescribed opening area which provide communicating passages between the interior and exterior of the arc shield 2 at the time of welding. Further, an upper wall 16 of the arc shield 2 is formed with a stud insertion passage 18 which is slightly larger than the outer diameter of the stud 10, while the arc shield 2 is additionally formed with a cylindrical lug 20 to be clamped by a welding machine to be explained below.

Figure 5:
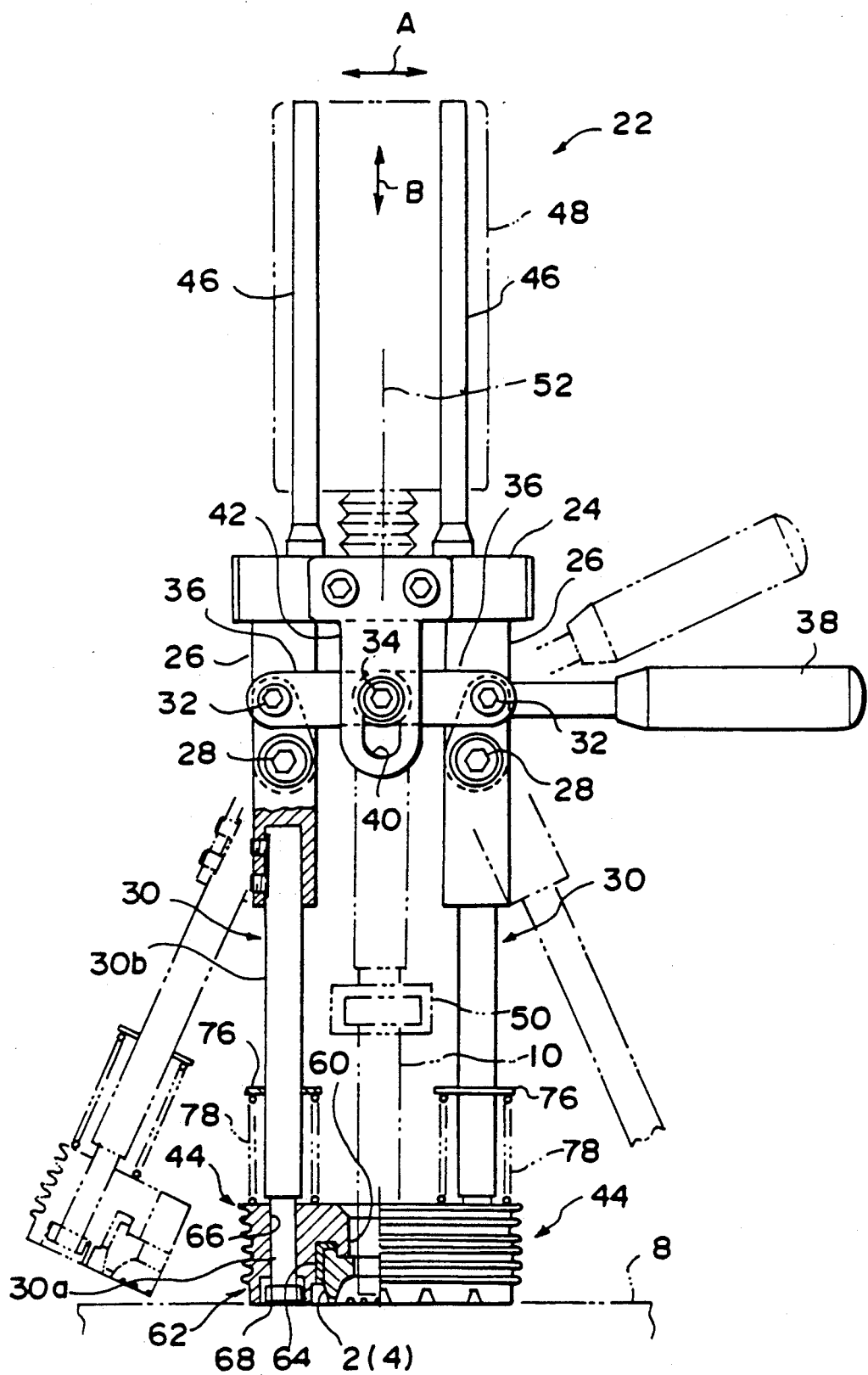
FIG. 5 is a front view showing an embodiment of the arc shield welding machine according to the present invention.
Figure 6:
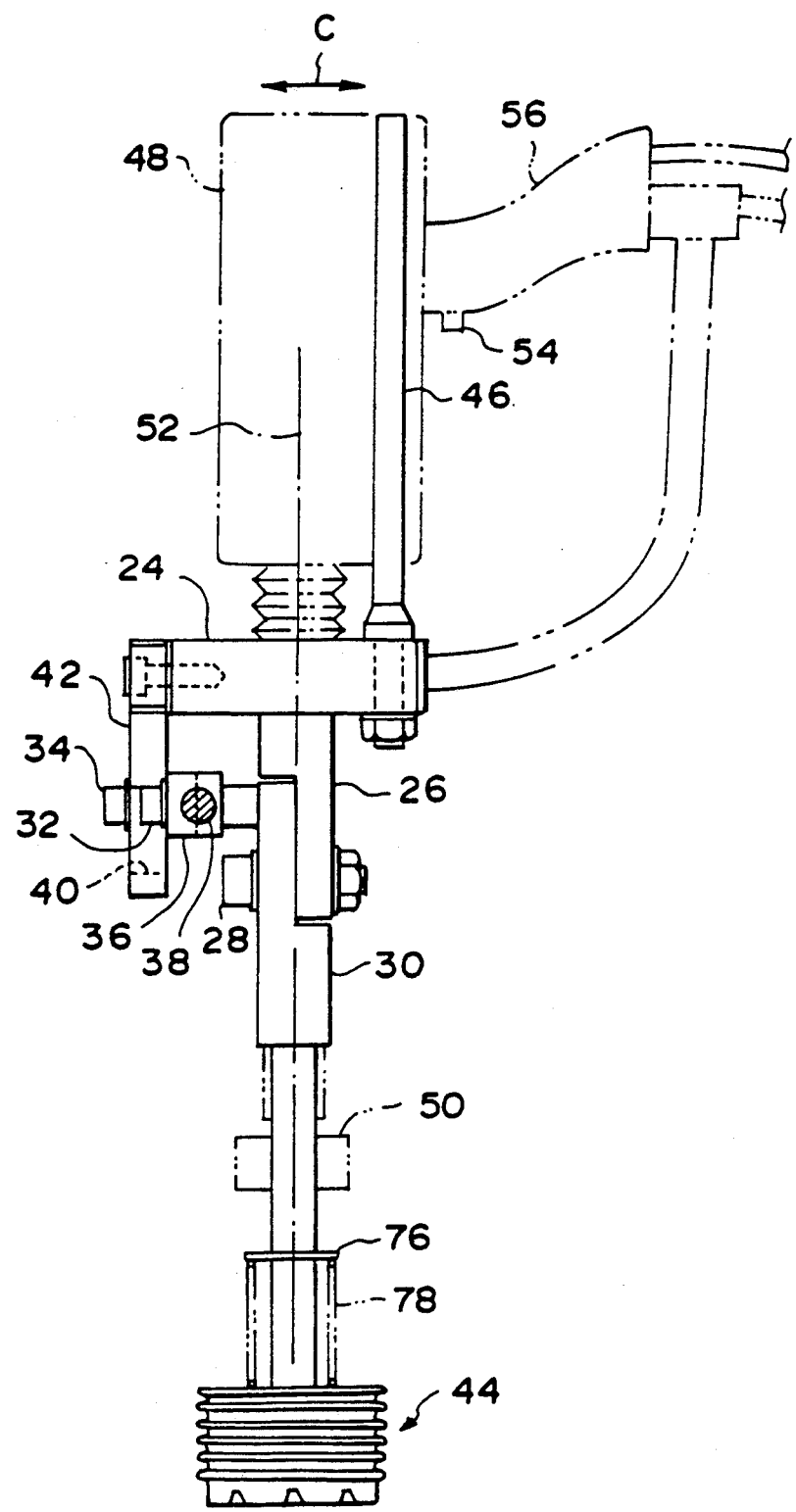
FIG. 6 is a right side view of the welding machine of FIG. 5, FIGS. 7 and 9 are front views showing the lever opening/closing mechanism of the welding machine of FIG. 5.

FIG. 5 is a front view of a welding machine for carrying out stud welding using the aforesaid arc shield 2, and FIG. 6 is a right side view of the welding machine shown in FIG. 5.

The illustrated welding machine 22 comprises a base 24, a pair of levers 30 each rotatably supported via a pivot pin 28 on one of two legs 26 fixed on the base 24 a pair of links 36 each rotatably connected at its one end to the upper end of one of the levers 30 and rotatably connected at its other end to the other member of the pair by a joint pin 34, a handle 38 fixed to said one end of one of the links 36 and extending laterally (in the direction of arrow A in FIG. 5), an oblong-hole member 42 fixed on the base 24 and having an oblong hole 40 extending vertically (in the direction of arrow B in FIG. 5) through which the joint pin 34 connecting the other ends of the links 36 passes, mounts 44 provided o the lower ends of the levers 30, and a welding gun 48 attached by a pair of rods 46 to stand upright on the base 24.

As illustrated by the broken lines in the figure, the levers 30 can be opened and closed by rotating the handle 38 vertically. Further, the lower end of the welding gun 48 is provided with a chuck 50 for retaining the head of the stud 10, and the welding gun 48 is also provided with a grip 56 having a welding switch 54.

The arc shield mounts 44 each retains one of the arc shield segments 4 and is equipped with a mount body 62 having an inner clamp member 60 and with outer clamp members 64. The associated arc shield segment 4 is clamped between the outer clamp members 64 and the inner clamp member 60 by pressing the outer clamp members 64 inward toward the arc shield segment 4.

Each mount body 62 is formed with a through-hole 66 and a small-diameter portion 30a at the end of the associated lever 30 is passed through the through-hole 66 and a nut 68 is screwed onto the lower end of the smalldiameter portion 30a, whereby the mount 44 is fixed on the lever 30.

Arc stud welding is carried out with the welding machine 22 as follows. First, the handle 38 is rotated upward from the position indicated by the solid lines in FIG. 5 to the position indicated by the broken lines. This causes the two levers 30 to open and assume the state shown in broken lines, whereafter the chuck 50 provided at the tip of the welding gun is caused to grip the head of the stud 10. Next, the handle 38 is rotated downward, thereby causing the levers 30 to close to the state shown in solid lines. In this state the arc shield mounts 44 provided on the respective levers 30 come into abutment with each other causing the arc shield segments 4 retained by the respective mounts 44 to abut on one another, thus forming the cylindrical arc shield 2 with the stud 10 enclosed thereby as illustrated in FIG. 4. Next, from this state the welding machine 22 is lowered to cause the lower surface of the stud 10 and the lower surface of the arc shield 2 to abut on the upper surface of the base metal 8 at a prescribed position thereon, whereafter the welding switch 54 on the welding gun grip 56 is pressed to carry out welding. After completion of welding, the handle 38 is rotated downward to open the levers 30. Further arc stud welding ca thereafter be repeated in a similar manner.

Figure 7:
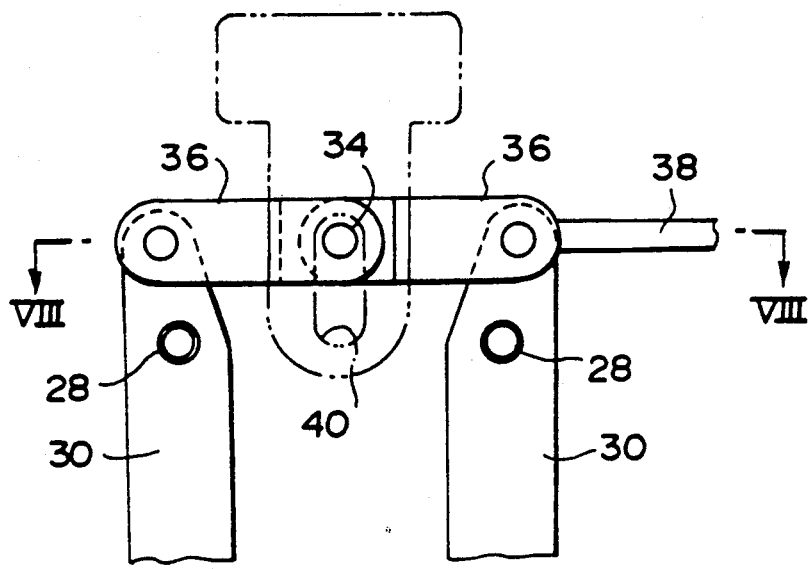
Figure 8:
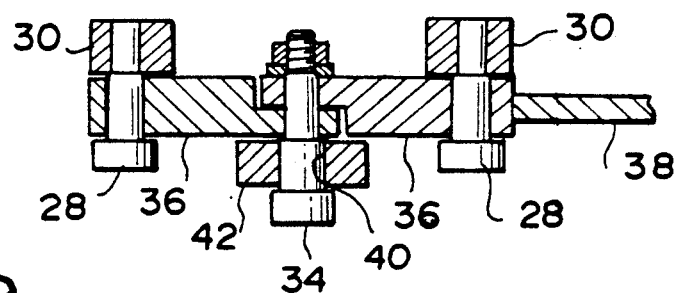
FIG. 8 is a sectional view taken along line VIII—VIII of FIG. 7, FIGS. 10 and 11 are detailed views of the arc shield retaining section of the welding machine of FIG. 5, FIG. 10 being a sectional view taken along line X—X in FIG. 11 and FIG. 11 being a sectional view taken along line XI—XI in FIG. 10, and FIGS. 12 to 14 are plan views for explaining changes in the retained state of the arc shield at high temperature.
Figure 9:
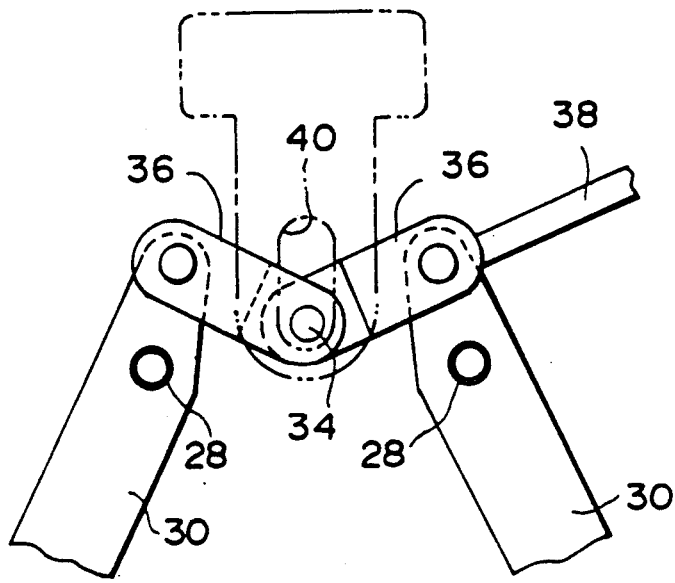

The opening/closing operation of the levers 30 by the handle 38 will now be explained in detail with reference to FIGS. 7-9. When the handle 38 is horizontal as shown in FIG. 7, the levers 30 are closed. Then, as shown in FIG. 9, when the handle 38 is rotated upward from this state, the joint pin 34 which rotatably connects the inward ends of the two links 36 moves downward along the oblong hole 40, causing the links 36 to incline as illustrated and the levers 30 to rotate about the pivot pins 28 such that their lower ends spread and assume the open state. Then if the handle 38 is rotated downward from the state shown in FIG. 9, the levers 30 return to their closed state as illustrated in FIG. 7. FIG. 8 is a sectional view taken along line VIII—VIII in FIG. 7.

As in the welding machine 22 described above the levers 30 (arc shield segments 4) can be opened and closed by rotating the handle 38, the opening/closing operation can be carried out with extreme ease and as desired.

Moreover, since the aforesaid welding machine 22 is constituted such that opening/closing of the levers 30 (arc shield segments 4) is conducted within a vertical plane including the stud 10, a large number of studs can be welded without any problem of interference or the like from other studs such as would be apt to arise should the welding machine 22 be constituted such that the opening/closing of the levers 30 is conducted in, for example, a plane perpendicular to the stud 10 (in a plane parallel to the surface of the base metal 8).

Further, the handle 38 functions not only as a means for opening and closing the levers 30 but also in cooperation with the grip 56 of the welding gun as a handle for stabilizing the welding posture. More precisely, while the grip 56 provided on the welding gun 48 extends laterally rearward from the rear surface of the welding gun 48 (in the direction of arrow C in FIG. 6), the handle 38 makes an angle of 90° relative to the grip 56 and, moreover, is disposed at a lower position. Since the handle 38 is provided perpendicular to the grip 56 of the welding machine and at a lower position than the grip 56, during welding the operator can grasp the grip 56 of the welding machine with his right hand while keeping his right index finger on the welding switch 54 and can maintain the welding machine 22 in good balance by gripping the handle 38 with his left hand. This makes it easier for the operator to maintain a stable welding posture and thus increases operational efficiency and reduces the likelihood of faulty welds.

The chuck 50 serves to hold the stud 10 aligned coaxially with the axis 52 of the welding gun 48 and the stud 10 gripped by the chuck 50 is positioned in a common plane with the two levers 30 fixed on the arc shield mounts 44. In other words, the levers 30 and the welding gun 48 are disposed such that the center axis of the stud 10 and the center axes of the two levers 30 fall within one and the same plane (extending laterally and vertically). As a result of this arrangement, the arc shield 2 makes reliable and uniform abutment with the upper surface of the base metal, enabling stable welding and improving the weld reliability.

Furthermore, in the aforesaid welding machine 22, the arc shield 2 and the mounts 44 are each divided into two segments and attached to the lower ends of the lever 30 which can be spread widely at the time of inserting the stud 10 into the chuck 50 so as to secure a large working space in the vicinity of the chuck 50. The stud 10 can thus be inserted into the chuck 50 with ease.

Still further, as will be explained later, one of the arc shield mounts 44 is provided on its contact surface with a guide pin 80 and the other is provided on its contact surface with a guide hole 82. Thus proper abutment between the arc shield mounts 44 and between the arc shield segments 4 can be ensured when the levers 30 are closed.

A detailed explanation will now be given with reference to FIGS. 10 and 11 regarding the retention of the arc shield segments 4 by the arc shield mounts 44.

Figure 10:
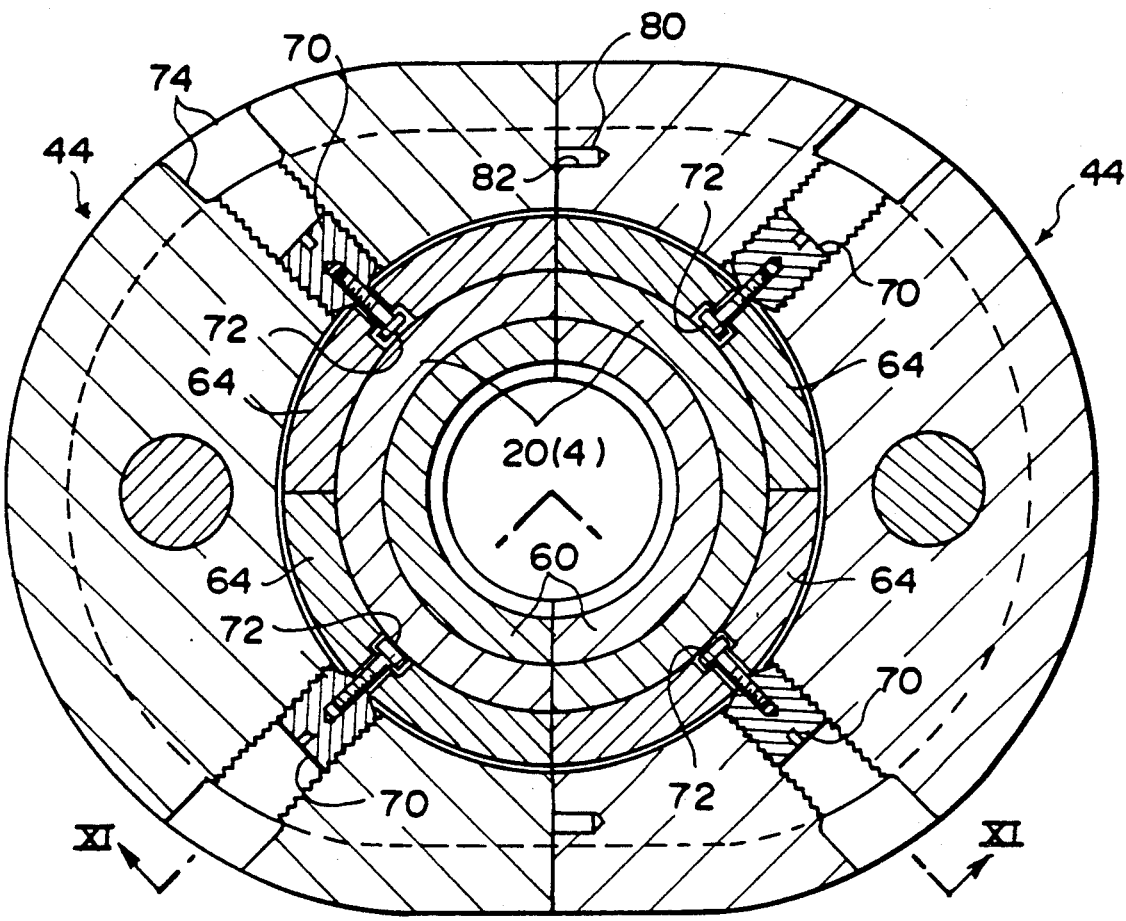
Figure 11:
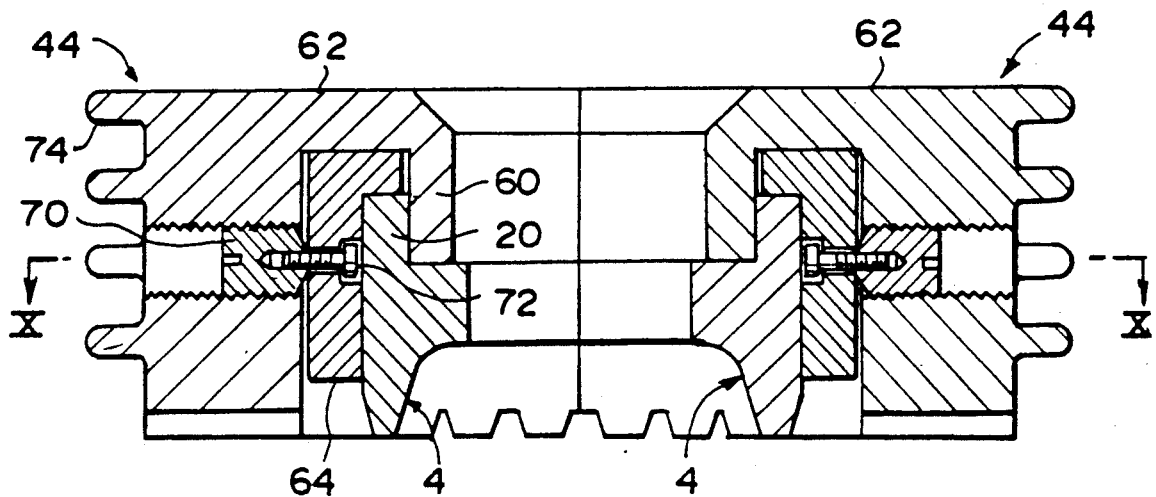

FIG. 10 is a sectional view taken along line XX in FIG. 11 and FIG. 11 is a sectional view taken along line XI-XI in FIG. 10, and both figures illustrate the state in which the levers 30 are closed to bring the pair of arc shield segments 4 into abutment and thus to form the cylindrical arc shield 2.

As illustrated, each amount body 62 is formed with a semicylindrical inner clamp member 60 which abuts on the inner surface of a semicylindrical lug 20 of the associated arc shield segment 4. The inner surface of the lug 20 of the arc shield segment 4 abuts on the outer surface of the inner clamp member 60 so as to attach the arc shield segment 4 to the mount body 62. Outwardly of each of the lugs 20 are provided two outer clamp members 64 each shaped as a quarter cylinder (of 90° accurate section). Each outer clamp member 64 is pressed toward the center (i.e. toward the center of the cylindrical arc shield 2 formed when the arc shield segments 4 are brought into abutment) by a pressure screw 70 threadedly engaged with the associated mount body 62 and serving as a pressure member, whereby the arc shield segments 4 are clamped between the inner and outer clamp members 60, 64.

So as to cause the pressure of the pressure screw 70 on the outer clamp member 64 to act toward the aforesaid center at the middle of the outer clamp member 64 (at the middle of the 90° accurate section), the arrangement is such that the tip of the pressure screw 70 contacts the middle of the outer clamp member 64 and the axis thereof is directed toward the aforesaid center.

By the arrangement in which the cylindrical arc shield 2 is divided into two arc shield segments 4 each of which is retained by being clamped between a semicylindrical inner clamp member 60 and two quarter cylinder outer clamp members 64 in the manner described above and each outer clamp member 64 is pressed toward the aforesaid center at its middle portion, it is possible to prevent cracking or the like of the arc shield segments 4 which might otherwise occur during welding because of the difference in coefficient of thermal expansion among the arc shield segments 4 on the one hand and the mount body 62 and the outer clamp member 64 on the other.

This will be explained. Prior to welding, the inner and outer clamp member 60, 64 and the lug 20 of the associated arc shield segment 4 are in contact throughout as illustrated in the plan view of FIG. 12. Welding is carried out in this state, resulting in thermal expansion of the members 60, 20 and 64 as the temperature of these members becomes high. While as mentioned earlier the arc shield segments 4 are made from ceramic, the inner and outer clamp member 60, 64 are made from a metal with a high thermal conductivity so as to increase their heat dissipation property. Thus the arc shield segments undergo almost no thermal expansion while the clamp members expand considerably. Therefore, if the outer clamp members 64 should be made semicylindrical in shape and the center peripheral portion thereof should be pressed toward the center, then as shown in FIG. 13 only the center portion of the lug 20 of the arc shield segment 4 would make contact with the outer clamp member 64' and receive an inwardly directed force, while only the end portions thereof would make contact with the inner clamp member 60 and receive an outwardly directed force therefrom. As can be easily understood from FIG. 13, a very large thermal stress (bending moment) would therefore act on the arc shield segment 4, making it vulnerable to cracking and breakage.

In contrast, in the welding machine according to this invention described above, each outer clamp member 64' is divided into two quarter cylinder outer clamp members 64 and each quarter cylinder clamp member 64 is pressed toward the center at its middle portion. As a result, the forces arising because of thermal expansion act as shown in FIG. 14. As can be easily understood from this figure, the thermal stress (bending moment) acting on each arc shield segment 4 is much smaller than that in the case of FIG. 13. Thus the danger of the arc shield segments 4 being cracked or broken as a result of the difference in coefficient of thermal expansion is markedly reduced.

A locknut 72 is engaged with each pressure screw 70. The locknut 72 passes through and fixes the associated outer clamp member 64. As a result, detachment of the outer clamp member 64 from the mount body 62 at the time the pressure of the pressure screw 70 on the outer clamp member 64 is relieved can be prevented.

Moreover, a prescribed gap is present around the locknut 72 so that the outer clamp member 64 is loosely secured. Due to this fact and the fact that the head of the pressure screw 70 (i.e. The portion thereof pressing onto the outer clamp member 64) is made generally conical in shape, the positional freedom of the outer clamp member 64 with respect to the pressure screw 70 is enhanced, whereby the amount of force acting on the arc shield segment 4 during the aforesaid thermal expansion is reduced.

To further reduce the amount of force acting on the arc shield segments 4 during thermal expansion, it is also possible, for example, to constitute the leading pressure portion of the pressure screw 70 as a spring or other cushioning mechanism (not shown) so as to enable positional variation in the aforesaid center direction.

Further, the arc shield mounts 44 (constituted of the mount bodies 62 and the outer clamp members 64) are, as explained earlier, fabricated from copper or a copper alloy to have a high thermal conductivity and the outer periphery of the arc shield mounts 44 is further provided with radiator fins 74 which are integral with the mount body 62. As a result, the high-temperature heat generated during welding does not accumulate in the ceramic arc shield but is efficiently dissipated into the air, whereby the arc shield is protected from high-temperature deterioration and its service life is extended.

In addition, each arc shield mount 44 is, by its mount body 62, attached between a shoulder portion of the associated lever 30 (the shoulder between the small-diameter portion 30a and a large-diameter portion 30b) and the nut 68 so as to be slidable along the prescribed length of the small-diameter portion 30a. Further, the large-diameter portion 30b has a spring seat 76 fixed thereon and a compression spring 78 is provided between the spring seat 76 and the upper surface of the mount body 62. As a result, there is constituted a cushioning cushioning mechanism enables the ceramic ar shield 2 to press onto the base metal 8 at the time of welding in a stable manner without exertion of undue force thereon. This is significant because prior to welding the lower ends of the levers 30 are, as shown in FIG. 5, positioned above the lower end of the arc shield 2, while during welding the lower ends of the levers 30 abut against the upper surface of the base metal 8 after the welding machine 22 has been pushed down toward the base metal 8. In other words, the arrangement is such that all of the downward pressure exerted by the operator for ensuring that the welding machine does not move during welding is transferred to the base metal 8 via the two levers 30, whereby the arc shield 2 is always pressed onto the base metal 8 by the constant and appropriate force of the compression spring 78.

Also, the entire periphery of the arc shield 2 is covered by the arc shield mounts 44, whereby the arc shield 2 is protected from damage and breakage by direct contact with surrounding materials or instruments.

The nature of the material of the arc shield 2 will now be explained.

While the arc shield 2 can be fabricated from any kind of material insofar as it exhibits superior thermal shock resistance property and low adherence property with respect to molten metal, it can be preferable fabricated from a ceramic containing not less than 20 weight % boron nitride. An arc shield 2 made: from such a ceramic containing not less than 20 weight % boron nitride is fully able to withstand the thermal shock (1,300° C. and higher) during arc welding and is also free from the adherence or molten metal. It can therefore be repeatedly used a large number of times by the aforesaid welding machine.

We claim:

1. An arc stud welding machine having an arc shield mount section for retaining a generally semicylindrical arc shield segment, said arc shield mount section comprising a semicylindrical inner clamp member for abutment against an inner surface of said arc shield segment, two quarter cylinder outer clamp members for abutment against an outer surface of said arc shield segment, and pressure means for applying to said outer clamp members at approximately the middle of the periphery thereof pressure in the direction of said arc shield segment.

2. An arc stud welding machine as defined in claim 1 wherein said arc shield mount section includes a mount body having a portion located outside said outer clamp members, and pressure screws screwed into said portion as said pressure means.

3. An arc stud welding machine as defined in claim 2 wherein said outer clamp members are engaged with said mount body by means of locknuts.

4. An arc stud welding machine as defined in claim 3 wherein said locknuts are screwed into said pressure screws.

5. An arc stud welding machine as defined in claim 1 wherein said arc shield mount section is integrally provided with said outer clamp member and said inner clamp member.

6. An arc stud welding machine as defined in claim 1 further comprising two levers each having said arc shield mount section at the tip thereof for retaining said arc shield segments, said levers being openable and closable for contacting and separating the two arc shield segments, and handle for opening and closing said levers.

7. An arc stud welding machine as defined in claim 6 wherein said handle extends perpendicular to the longitudinal direction of a stud on which the welding machine is mounted.

* * * * *